United States Patent [19]

Notohara et al.

[11] Patent Number: 5,050,057
[45] Date of Patent: Sep. 17, 1991

[54] POWER SOURCE APPARATUS

[75] Inventors: Yasuo Notohara, Hitachi; Tsunehiro Endo, Hitachioota; Koujirou Yamashita; Motoo Futami, both of Hitachi; Shigeru Kishi, Oohira, all of Japan

[73] Assignee: Hitachi, Ltd., Tokyo, Japan

[21] Appl. No.: 467,280

[22] Filed: Jan. 18, 1989

Related U.S. Application Data

[63] Continuation of Ser. No. 243,615, Sep. 13, 1988, abandoned.

[30] Foreign Application Priority Data

Sep. 16, 1987 [JP] Japan .................. 62-229580
Oct. 28, 1987 [JP] Japan .................. 62-270461

[51] Int. Cl.$^5$ ............................................. H02M 5/45
[52] U.S. Cl. ........................................ 363/37; 363/124
[58] Field of Search .................... 363/35, 37, 124; 318/729, 800, 801, 805, 822, 823

[56] References Cited

U.S. PATENT DOCUMENTS

| | | | |
|---|---|---|---|
| 4,340,931 | 7/1982 | Endo et al. ............... | 363/126 X |
| 4,384,321 | 5/1983 | Rippel ..................... | 363/124 |
| 4,386,394 | 5/1983 | Kocher et al. ............ | 363/20 |
| 4,412,277 | 10/1983 | Mitchell ................... | 363/124 X |
| 4,591,963 | 5/1986 | Retotar .................... | 363/37 X |
| 4,704,023 | 7/1987 | Glennon . | |
| 4,719,552 | 1/1988 | Albach et al. ............ | 363/44 |
| 4,761,725 | 8/1988 | Henze ...................... | 363/46 |
| 4,780,802 | 10/1988 | Miyashita et al. ........ | 363/37 |
| 4,816,982 | 3/1989 | Severinsky ............... | 363/44 |

FOREIGN PATENT DOCUMENTS

| | | | |
|---|---|---|---|
| 0117578 | 9/1981 | Japan ...................... | 363/37 |
| 0198873 | 11/1984 | Japan ...................... | 363/44 |
| 0194766 | 10/1985 | Japan ...................... | 363/37 |
| 0277075 | 12/1987 | Japan . | |
| 2085204 | 4/1982 | United Kingdom ...... | 363/37 |

Primary Examiner—Steven L. Stephan
Assistant Examiner—Kristine Peckman
Attorney, Agent, or Firm—Antonelli, Terry, Stout & Kraus

[57] ABSTRACT

A power source apparatus has a power factor improving circuit which uses switching elements (4) as buildup transistors. According to the power source apparatus of the present invention, a current carrying ratio of the switching elements is decided to be a value which is obtained by subtracting a number of proportional value of the power source current waveform from the maximum current carrying ratio. Since the device of the present invention does not necessitate a detecting circuit of the power source voltage waveform for outputting an instruction waveform, the circuit thereof is simple and is not affected by the voltage change of the power source and noise generated at the power source.

16 Claims, 11 Drawing Sheets

(A) WAVEFORM OF POWER SUPPLY VOLTAGE (B) WAVEFORM OF POWER SUPPLY CURRENT (C) CURRENT CARRYING RATIO (D) RIPPLE COMPONENT OF DC OUTPUT VOLTAGE (E) WAVEFORM OF POWER SUPPLY CURRENT (F) CURRENT CARRYING RATIO CONTAINING RIPPLE COMPONENT

POWER SOURCE APPARATUS

This application is a continuation of application Ser. No. 243,615, filed Sept. 13, 1988, now abandoned.

FIELD OF THE INVENTION

The present invention relates to a power source circuit for converting an AC power source into a direct current using a rectifying circuit and a smoothing circuit. More particularly, the invention relates to power source apparatus adapted to suppress higher harmonics in the power source current.

BACKGROUND OF THE INVENTION

A conventional rectifying circuit which rectifies an AC power source to convert it into a DC power source has been disclosed in FIGS. 4 and 6 of Japanese Patent Laid-Open No. 59-198873 published on Nov. 10, 1984 in the title of "Power source rectifying circuit" which is provided with a circuit for suppressing higher harmonics in the source current. According to this publication, a switching element is connected to an output terminal of the rectifier circuit, a current waveform is compared with a synchronizing error signal obtained by multiplying a difference between the DC output voltage and a setpoint voltage by a voltage signal of the AC power source, and the switching element is turned on and off depending upon the polarity of the difference.

According to the above-mentioned prior art, the AC current instruction waveform for improving the power factor is formed relying upon an AC voltage waveform. When the AC voltage undergoes a change or when noise is generated the current instruction waveform is directly affected imposing a problem with regard to reliability.

Furthermore, a device must be provided to detect AC voltage waveforms, thus causing the circuit to become complex and bulky.

SUMMARY OF THE INVENTION

An object of the present invention is to provide a power source apparatus which is able to improve the power factor without using an AC current instruction waveform and, at the same time, suppress ripples in the DC voltage.

The object of the present invention is achieved by providing a power source current detecting and amplifying circuit for detecting and amplifying a power source current, and a current carrying ratio instruction preparation means for preparing a current carrying ratio instruction value of the switching element. A current carrying ratio instruction value of the switching element is obtained by subtracting the output of the power source current detecting and amplifying circuit from the current carrying ratio instruction value that gives a maximum current carrying ratio, and the switching element is operated based upon this current carrying ratio instruction value.

In other words, the circuit for improving the power factor of the power source current according to the present invention fundamentally consists of a reactor, a switching element, a power source current detecting and amplifying circuit and a current carrying ratio instruction preparation means. The current carrying ratio instruction value of the switching element is obtained by subtracting the output of the power source current detecting and amplifying circuit from the current carrying ratio instruction value that gives a maximum current carrying ratio, and the switching element is operated relying upon the current carrying ratio instruction value.

The operation of the present invention will now be described. The current carrying ratio x is determined in compliance with the following equation.

$$x = C - KI_s \quad (1)$$

where $I_s$ denotes a detected power source current, K denotes a proportional coefficient, and C denotes a constant.

Further, the equation of the circuit can be approximated by the following equation, $$I_s = \frac{1}{L}\int\{V_s - (1-x)E_d\}dt + I_0 \quad (2)$$

where $I_0$ denotes an initial current of $I_s$, L denotes the inductance of the reactor, and $V_s$ denotes an absolute value of the power source voltage.

By substituting the equation (1) for the equation (2), and regarding that $V_s = V_m \sin \omega t$, we obtain the following equation.

$$I_s = \frac{\omega V_m}{L} \cdot \frac{1}{\omega^2 + \alpha^2}\left(e^{-\alpha t} - \cos\omega t + \frac{\alpha}{\omega}\sin\omega t\right) + I_0 e^{-\alpha t} \quad (3)$$

where $I_0$ is an initial value of $I_s$, and $\alpha = K \cdot E_d / L$. Here, if $\alpha$ is sufficiently great, i.e., if $\alpha \gg \omega$ and $e^{-\alpha t} \approx 0$, then, there is obtained the following equation, $$I_s = \frac{V_m}{KE_d}\sin\omega t \quad (4)$$

Here, if K and $E_d$ remain constant, then the power source current assumes a sinusoidal waveform which is in synchronism with the power source voltage, and the power factor can be controlled to become nearly 1.

Figure 3:
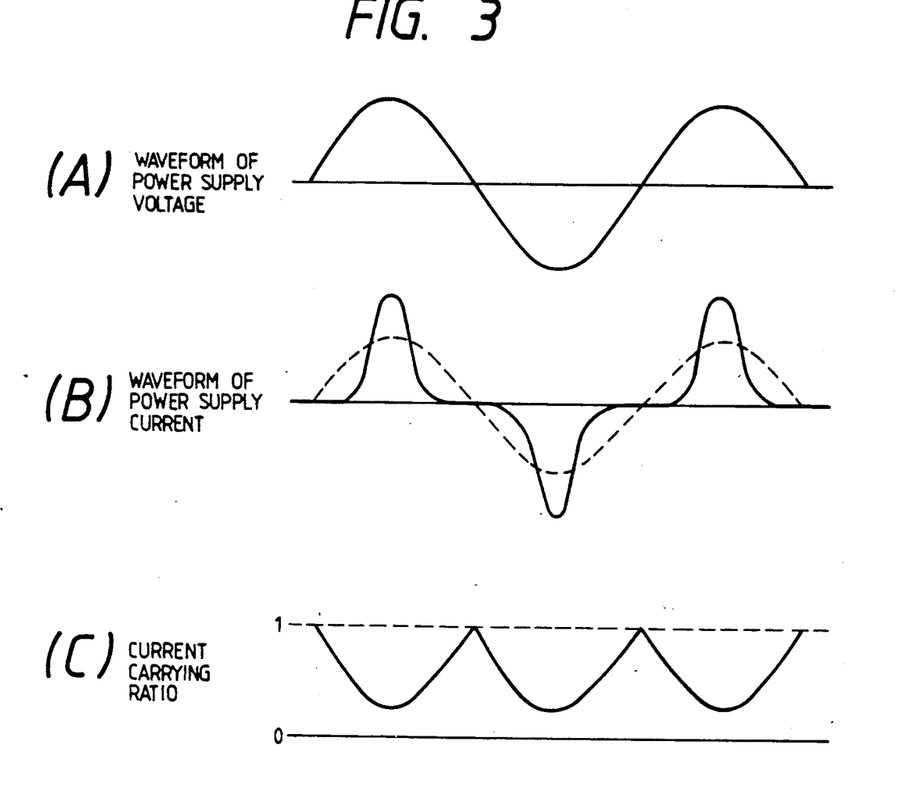
FIG. 3 is a diagram illustrating the principle of the apparatus shown in FIG. 1 of the present invention.

The aforementioned principle will now be described in further detail in conjunction with FIG. 3 which shows a power source voltage, a power source current, and a current carrying ratio of a transistor. When the transistor is not performing the switching operation, the power source current flows into the capacitor only when it is to be electrically charged and contains much higher harmonic components as represented by a solid line in FIG. 3(B). Therefore, in order to control the power source current so that it assumes a sinusoidal waveform as shown in dotted line of FIG. 3(B), the current carrying ratio must be increased in the region of a small power source voltage, and the current carrying ratio must be decreased to suppress the current in the region of a high power source voltage. That is, the current carrying ratio must be controlled as shown in FIG. 3(C). Here, if a current carrying ratio instruction value is obtained by subtracting the output of the power source current detecting and amplifying circuit from the current carrying ratio instruction value that gives a maximum current carrying ratio, i.e., 1, the current carrying ratio decreases in the region of a large power source current, i.e., decreases in the region of a high power source voltage, and the current carrying ratio increases in the region of a small power source current, i.e., increases in the region of a low power source voltage. Therefore, the power source current assumes a sinusoidal waveform which is close to the current carrying ratio waveform shown in FIG. 3(C), and the amount of higher harmonic components can be decreased.

DETAILED DESCRIPTION OF THE PREFERRED EMBODIMENTS

Figure 1:
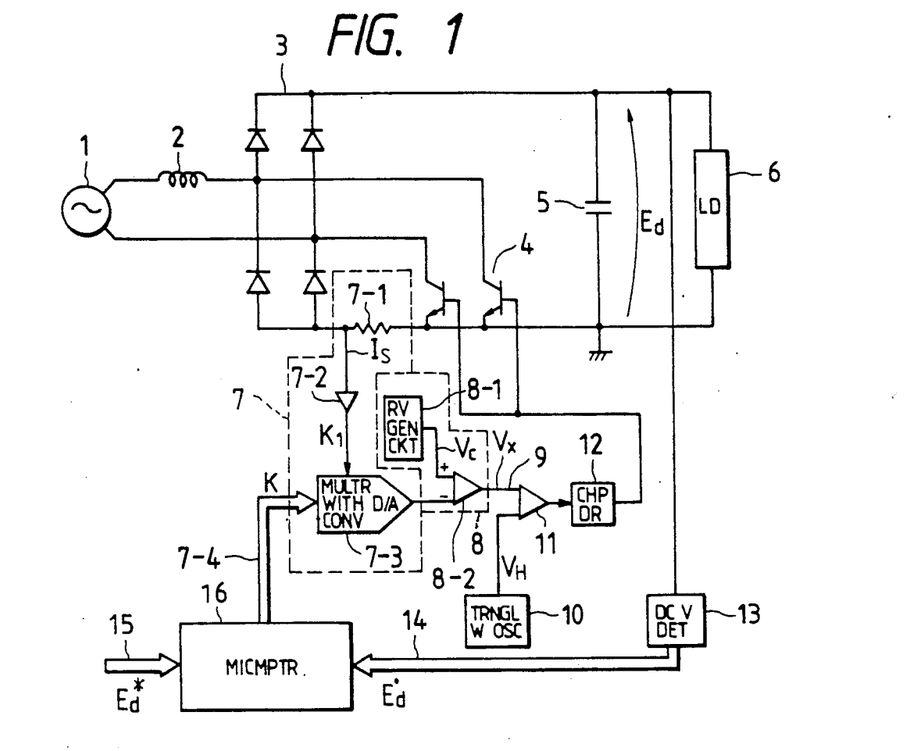
FIG. 1 shows a diagram illustrating a circuit structure of one embodiment of the present invention.

Referring to FIG. 1, an AC power source 1 is converted into a DC voltage Ed through a reactor 2, a rectifying circuit 3, a transistor 4, and a capacitor 5, to supply electric power to a load 6.

A control circuit for controlling the DC voltage Ed consists of a power source current detecting and amplifying circuit 7 for detecting and amplifying a power source current, a current carrying ratio instruction preparation means 8 which produces a current carrying ratio instruction value 9 based on the output of the power source current detecting and amplifying circuit 7, a comparator 11 that produces a chopper signal for the transistor 4 by comparing the current carrying ratio instruction value 9 with a triangular wave which is the output of a triangular wave oscillator 10, a chopper driver 12 for the transistor 4, a DC voltage detector 13 for detecting the DC voltage Ed, and a microcomputer 16 which calculates a proportional gain K based upon a DC voltage detect signal 14 ($E_d$) and a DC voltage instruction 15 ($E_d$). As is well known in the art, the combination of comparator 11 and triangular wave oscillator 10 constitutes a pulse-width modulation circuit for outputting a variable duty ratio signal.

The power source current detecting and amplifying circuit 7 consists of a detect resistor 7-1 which detects the power source current, a power source current amplifier 7-2 which amplifies the output of the detect resistor 7-1 a predetermined number of times, and a D/A converter 7-3 with a multiplication function which multiplies the output signal K1 of the power source current amplifier 7-2 by the proportional gain K which is a digital input 7-4, and produces the multiplied result.

The current carrying ratio instruction preparation means 8 consists of a reference voltage generating circuit 8-1, and an operational amplifier 8-2 which produces a current carrying ratio instruction value 9(Vx) by subtracting the output of the power source current detecting and amplifying circuit 7 from the output Vc of the reference voltage generating circuit 8-1. Here, the output Vc of the reference voltage generating circuit 8-1 is selected to become nearly equal to a maximum value ($V_H$) of the triangular wave oscillator 10.

In the thus constructed control circuit, if the resistance of the detect resistor 7-1 is denoted by R, the amplification factor of the power source current amplifier 7-2 by $K_1$, the power source current by Is, and the current carrying ratio instruction 9 by Vx, then, $$Vx = Vc - K \cdot K_1 R \cdot Is \qquad (5)$$

Here, if the output Vc of the reference voltage generating circuit 8-1 is selected to become equal to a maximum value $V_H$ of and the output of the triangular wave oscillator 10 then the current carrying ratio x is given by, $$x = \frac{Vx}{V_H} = 1 - \frac{KK_1R}{V_H} Is \qquad (6)$$

whereby the power source current assumes a sinusoidal waveform because of the same reasons as mentioned above, and the power factor can be controlled to become nearly 1. Here, the current carrying ratio x can be changed by changing the proportional gain K.

In addition to calculating the proportional gain K from the DC voltage detect signal 14 and the DC voltage instruction 15 as mentioned above, the microcomputer 16 executes a variety of programs necessary for controlling the DC voltage Ed, such as receiving the DC voltage detect signal 14 and the DC voltage instruction 15, and sending the proportional gain K to the D/A converter 7-3 with multiplication function.

Hereunder, we will explain a control method of the DC voltage Ed. In FIG. 1, a difference is calculated between the DC voltage detect signal 14 and the DC voltage instruction 15, and the proportional gain K is increased when the DC voltage detect signal 14 is greater, and is decreased when the DC voltage instruction 15 is greater. For instance, the proportional gain K increases and the current carrying ratio instruction value 9 decreases when the DC voltage detect signal 14 is greater. Therefore, the input current decreases and an increased amount of electric power is sent to the side of the DC electric power, causing the DC voltage Ed to drop. The above-mentioned operation is repeated until the deviation becomes zero between the DC voltage detect signal 14 and the DC voltage instruction 15, so that the DC voltage Ed is controlled.

Figure 2:
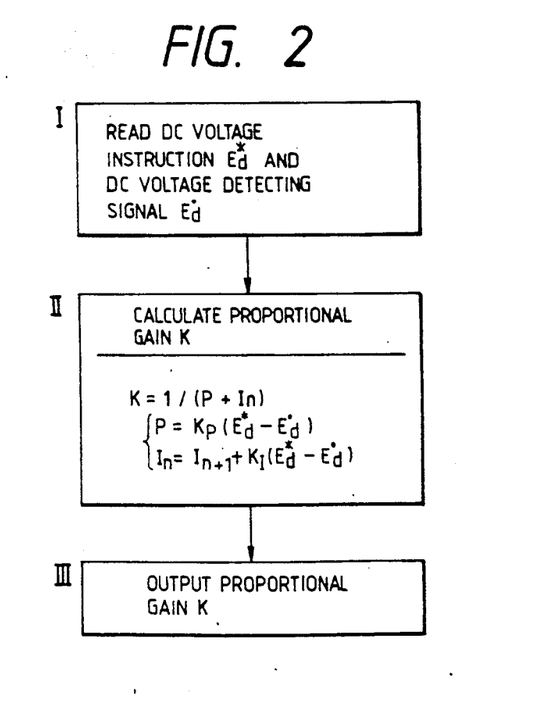
FIG. 2 is the first embodiment of a flow chart showing a DC voltage control process executed by a microcomputer denoted by reference numeral 16 in FIG. 1.

FIG. 2 illustrates the contents of the DC voltage control process executed by the microcomputer 16 based upon this idea, i.e., illustrates the procedure for preparing a proportional gain which will be sent to the D/A converter 7-3 with multiplication function.

In a process I of FIG. 2, the microcomputer 16 of FIG. 1 receives a DC voltage instruction $E_d^*$ and a DC voltage detect signal $E_d^*$. In a process II, the microcomputer obtains a proportional term P and an integration term In from a deviation voltage $\Delta Ed = E_d^* - E_d^*$ between the DC voltage instruction $E_d^*$ and the DC voltage detect signal $E_d^*$, and obtains a proportional gain K as an inverse number of the sum thereof. Here, the proportional term P is a product of the proportional gain Kp and the deviation voltage $\Delta Ed$, and the integration term In is obtained by adding the product of the integration gain $K_1$ and the deviation voltage $\Delta Ed$ to the second to last integration term $I_{n-1}$. In a process III, the proportional gain K is sent to the D/A converter 7-3 with multiplication function. The DC voltage Ed is controlled by repeating the above-mentioned DC voltage control processing.

Figure 4:
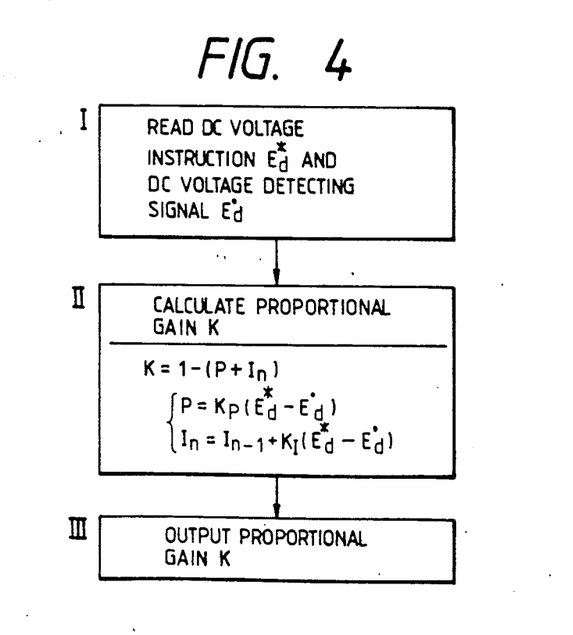
FIG. 4 is the second embodiment of a flow chart showing a DC voltage control processing executed by a microcomputer denoted by reference numeral 16 in FIG. 1.

FIG. 4 illustrates a power source apparatus according to a second embodiment of the present invention, i.e., illustrates the contents of the DC voltage control processing that will be executed by the microcomputer (designated by reference numeral 16 in FIG. 1). The circuit structure is the same as that of the case of FIG. 1. What makes a difference from FIG. 2 is only with regard to means for obtaining a proportional gain K; i.e., the proportional gain K is obtained by subtracting from 1 the sum of the proportional term P and the integration term $I_n$. According to the second embodiment, therefore, no calculation for division is needed, enabling the calculating to be simplified.

Figure 5:
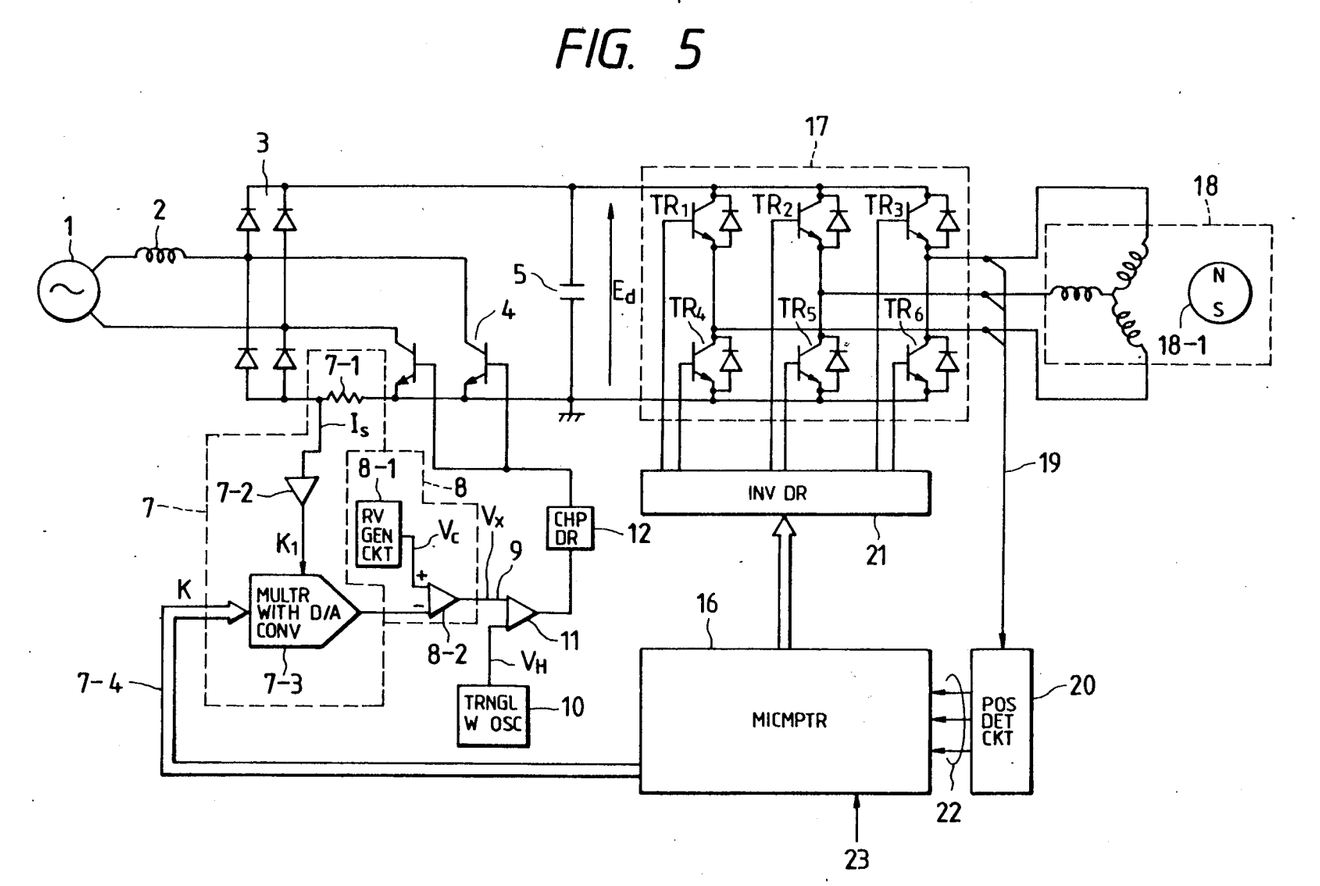
FIG. 5 shows a diagram illustrating a circuit structure of the third embodiment of the present invention.
Figure 6:
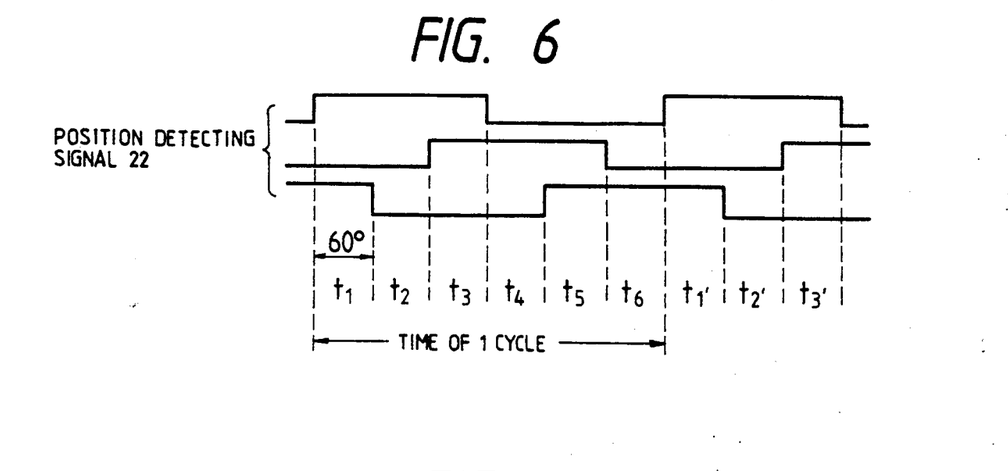
FIG. 6 is a diagram of an output waveform of a position detect signal denoted by reference numeral 22 in FIG. 5.
Figure 7:
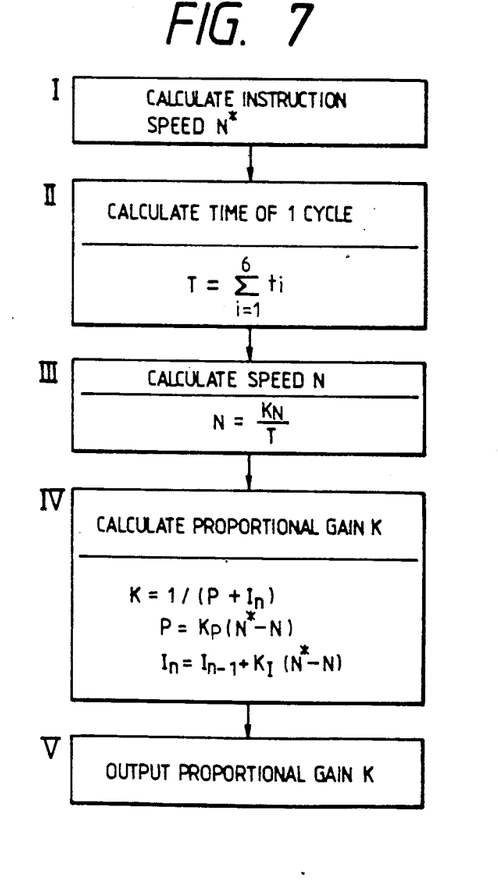
FIG. 7 is a flow chart of a speed control processing executed by a microcomputer denoted by reference numeral 16 in FIG. 5.

FIGS. 5 to 7 illustrate a third embodiment of the power source apparatus of the present invention. The third embodiment of the present invention is adapted to controlling the speed of a brushless DC motor, and the circuit structure thereof is shown in FIG. 5.

In FIG. 5, the AC power source 1 is converted into a DC voltage Ed through a reactor 2, a rectifying circuit 3, a transistor 4 and a capacitor 5; i.e., the DC electric power is supplied to an inverter 17 to drive a synchronous motor 18.

A control circuit for controlling the speed of the synchronous motor 18 consists of a microcomputer 16, a position detecting circuit 20 for detecting the magnetic pole position of the rotor 18-1 of the synchronous motor 18 from a motor terminal voltage 19, a driver 21 for transistors TR1 to TR6 that constitute an inverter 17, a power source current detecting and amplifying circuit 7 for detecting and amplifying the power source current, a current carrying ratio instruction preparation means 8 for preparing a current carrying ratio instruction value 9 from the output of the power source current detecting and amplifying circuit 7, a comparator 11 which produces a chopper signal for the transistor 4 by comparing the current carrying ratio instruction value 9 with a triangular wave which is the output of the triangular wave oscillator 10, and a chopper driver 12 for the transistor 4. Here, the power source current detecting and amplifying circuit 7 and the current carrying ratio instruction preparation means 8 are constructed in the same manner as those of FIG. 1.

The microcomputer 16 executes a variety of programs necessary for driving the synchronous motor 18, such as receiving a position detect signal 22 from the position detecting circuit 20 and a speed instruction 23, sending an inverter drive signal to the inverter driver 21, calculating a proportional gain K, and sending the proportional gain K to the D/A converter 7-3 with a multiplication function.

FIG. 6 is a diagram which illustrates the output waveform of a position detect signal denoted by reference numeral 22 in FIG. 5, and wherein the condition of the three-phase signal changes after every 60°. The times $t_1$ to $t_6$ are measured every after 60°, and the time T of one cycle is found to detect the speed of the synchronous motor 18.

FIG. 7 illustrates the contents of a speed control process executed by the microcomputer which is denoted by reference numeral 16 in FIG. 5, i.e., illustrates the procedure for producing a proportional gain K that will be sent to the D/A converter 7-3 with multiplication function.

In a process I of FIG. 7, the microcomputer denoted by reference numeral 16 in FIG. 5 calculates an instruction speed N* based on a speed instruction 23 sent from an external unit. A process II finds the time T of one cycle of the position detect signal, and a process III calculates the speed N from the time T of one cycle and the proportional constant $K_N$. In a process IV, furthermore, a proportional term P and a integration term $I_n$ are prepared from the deviation speed $\Delta N = N^* - N$ between the instruction speed N* and the detected speed N, and a proportional gain K is obtained as an inverse number of the sum thereof. Here, the proportional term P is a product of the proportional gain $K_p$ and the deviation speed $\Delta N$, and the integration term $I_n$ is obtained by adding the product of the proportional gain $K_I$ and the deviation speed $\Delta N$ to the second to last integration term $I_{n-1}$.

In a process V, the proportional gain K is sent to the D/A converter 7-3 with multiplication function. By repeating the above-mentioned speed control process, the proportional gain K is corrected until the instruction speed N* and the detected speed N become equal to each other, so that the speed of the synchronous motor is controlled.

In this embodiment, the proportional gain K is directly found from the deviation speed. By combining this embodiment with the first embodiment, furthermore, it is also possible to find the proportional gain K utilizing the sum of the proportional term and integration term of deviation speed as the DC voltage instruction $E_d^*$.

Figure 8:
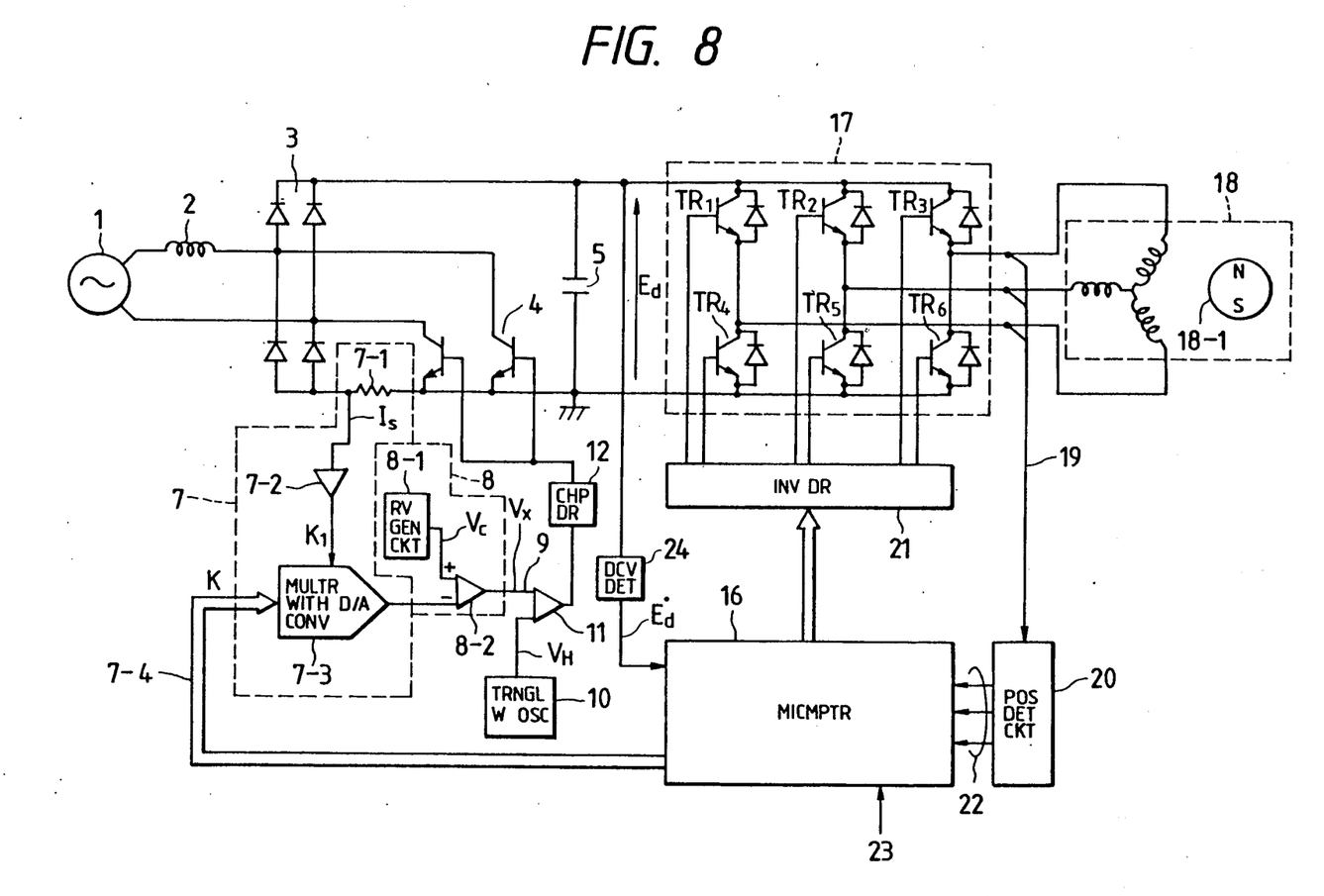
FIG. 8 shows a diagram illustrating a circuit structure of the 4th embodiment of the present invention.

In FIG. 8, the same parts as in FIG. 5 are indicated by the same symbols. Different from the previous embodiment in FIG. 5 is that a DC voltage detector 24 is connected to the position terminal of the condenser 5, and outputs a DC voltage detecting signal $E_d^*$ to the microcomputer 16.

Figure 9:
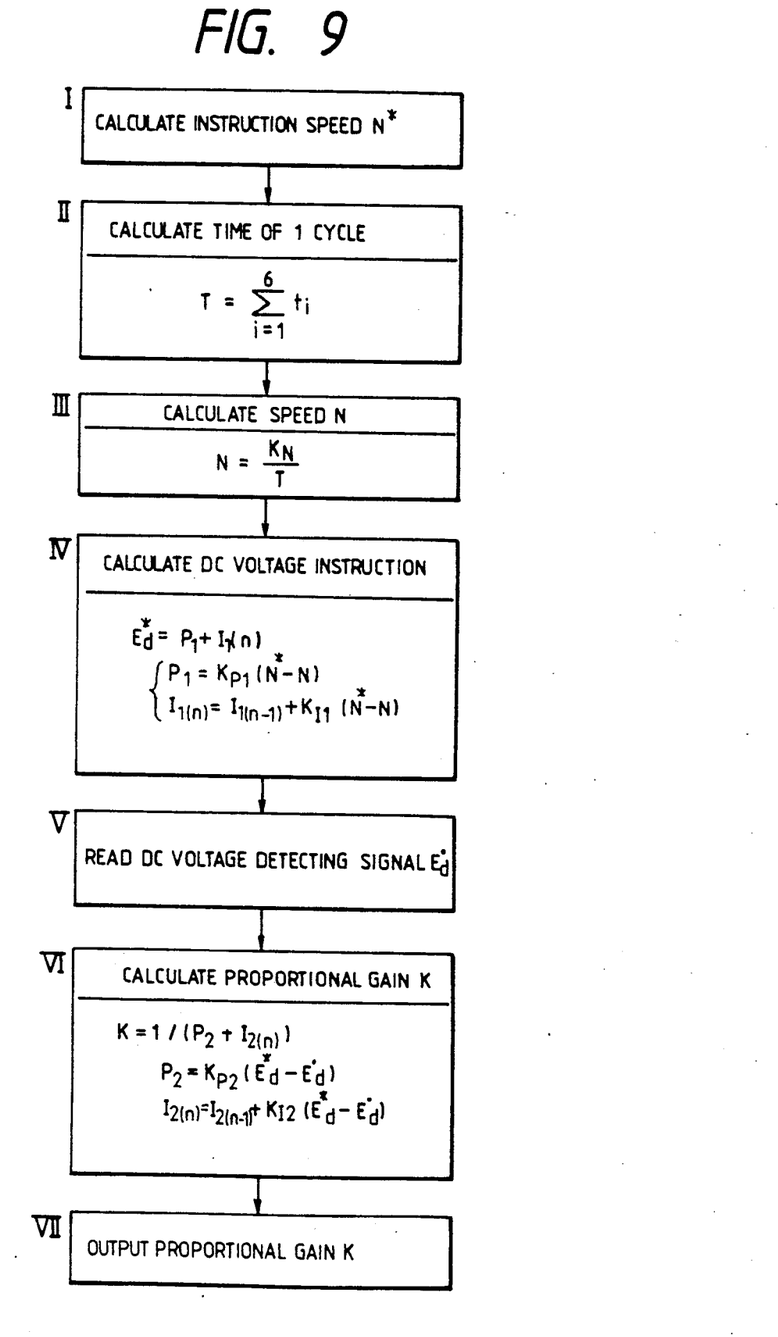
FIG. 9 is a flow chart showing a DC voltage control processing executed by a microcomputer denoted by reference numeral 16 in FIG. 8.

In a process I of FIG. 9, the microcomputer denoted by reference numeral 16 in FIG. 8 calculates an instruction speed N* based on a speed instruction 23 sent from an external unit. A process II finds the time T of one cycle of the position detect signal, and a process III calculates the speed N from the time T of one cycle and the proportional constant $K_N$. In a process IV, furthermore, a proportional term $P_1$ and an integration term $I_{1(n)}$ are prepared from the deviation speed $\Delta N = N^* - N$ between the instruction speed N* and the detected speed N, and obtains a DC voltage instruction $E_d^*$. Here, the proportional term $P_1$ is a product of the proportional gain $K_{P1}$ and the deviation speed $\Delta N$, and the integration term $I_{1(n)}$ is obtained by adding the product of the proportional gain $K_{I1}$ and the deviation speed $\Delta N$ to the second to last integration term $I_{1(n-1)}$.

In a process V, the DC voltage detecting signal $E_d$ is read out of the DC voltage detector (24). In a process VI, a proportional term $P_2$ and an integration term $I_{2(n)}$ are prepared from the deviation voltage $\Delta E = E_d^* - E_d$ between the DC voltage instruction $E_d^*$ and the DC voltage detecting signal $E_d$, and a proportional gain K is obtained as an inverse number of the sum thereof. Here, the proportional term $P_2$ is a product of the proportional gain $K_{P2}$ and the deviation voltage $\Delta Ed$, and the integration term $I_{2(n)}$ is obtained by adding the product of the proportional gain $K_{I2}$ and the deviation voltage $\Delta Ed$ to the second last integration term $I_{(n-1)}$. In a process VII, the proportional gain K is sent to the D/A converter 7-3 with multiplication function. By repeating the above-mentioned speed control process, the proportional gain K is corrected until the instruction speed N* and the detected speed N become equal to each other, so that the speed of the synchronous motor is controlled.

Figure 10:
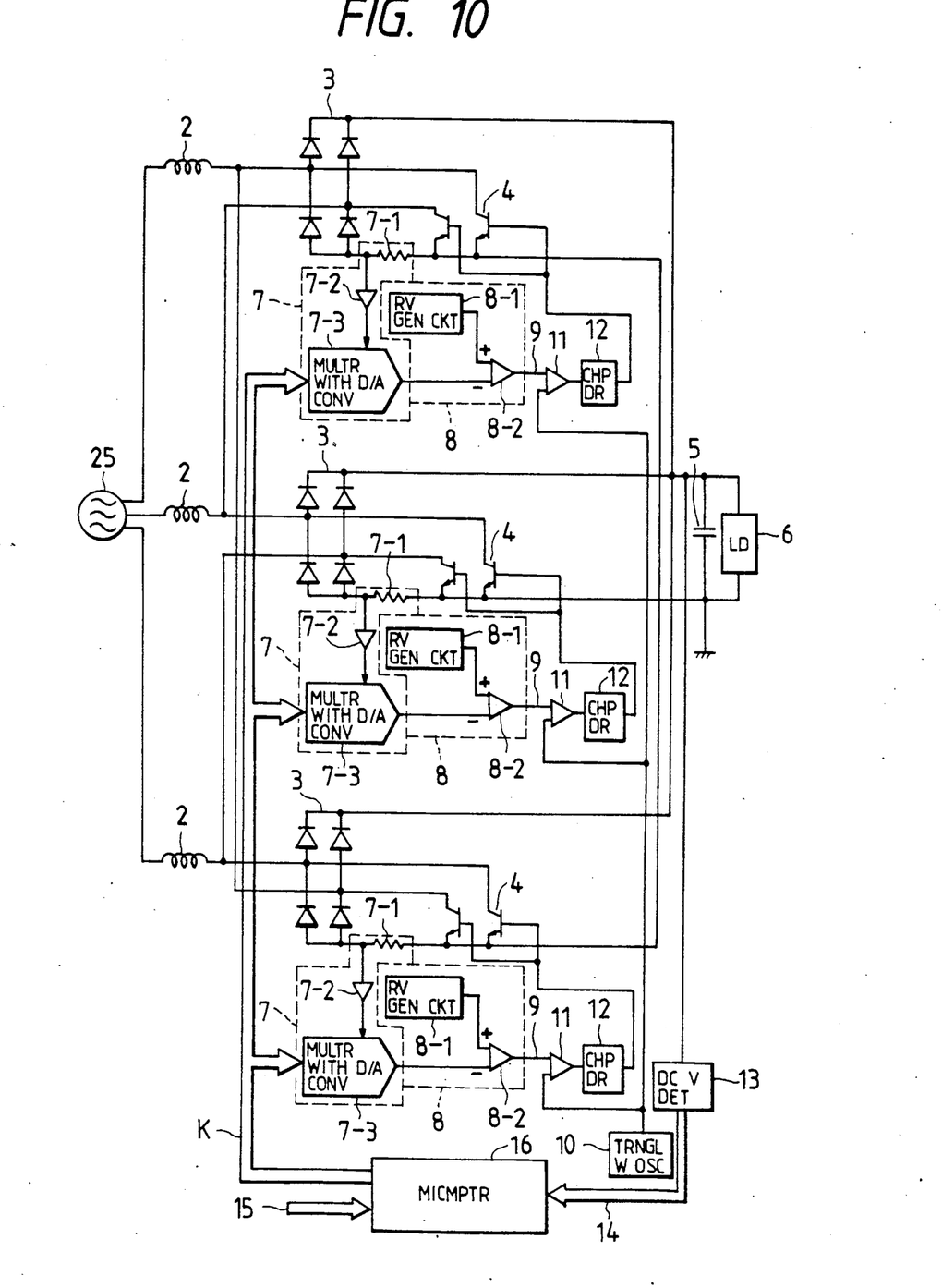
FIG. 10 is a diagram of the circuit structure of a power source apparatus according to the 5th embodiment which inputs a power from a three-phase AC power source.

FIG. 10, illustrates a power source apparatus according to a fourth embodiment of the present invention, wherein a three-phase AC power source 25 is input. In FIG. 10, three single-phase power source apparatuses are combined together. The method of operation and the principle of operation are the same as those of the single-phase power source apparatus.

As will be obvious from the description of the various embodiments, the present invention does not require a sinusoidal current instruction waveform for improving the power factor and also does not require the power source voltage detecting circuit, for preparing a current instruction waveform, thus enabling the circuit to be simplified and reduced in size. Furthermore, since the current instruction waveform is not directly affected by the voltage change on the power source voltage or the noise, the power source apparatus features improved reliability against voltage change and noise.

In the above embodiments, we explained the power source apparatuses in which the DC output voltage Ed does not contain ripple components.

In practice, however, the DC output voltage Ed contains ripple components and does not remain constant. Therefore, the power supply current undergoes change, and a neat sinusoidal waveform is not obtained causing the power factor to decrease.

When the DC output voltage Ed increases according to the equation (4), the power source current Is decreases. When the DC output voltage Ed decreases, on the other hand, the power current is increased.

As represented by the equation (1), the power source current Is undergoes the change due to ripple component $\Delta Ed$ in the DC output voltage Ed and the current carrying ratio x changes. Therefore, the current carrying ratio x is given by the following equation such that the change thereof can be suppressed by the ripple component $\Delta Ed$ in the DC output voltage Ed, $$x = C - K_1 Is + K_2 \Delta Ed \qquad (7)$$

This helps prevent the power factor from being decreased by the ripple components in the DC voltage and makes it possible to eliminate the ripple components in the DC output voltage.

The aforementioned principle will now be described with reference to FIG. 12.

Figure 12:
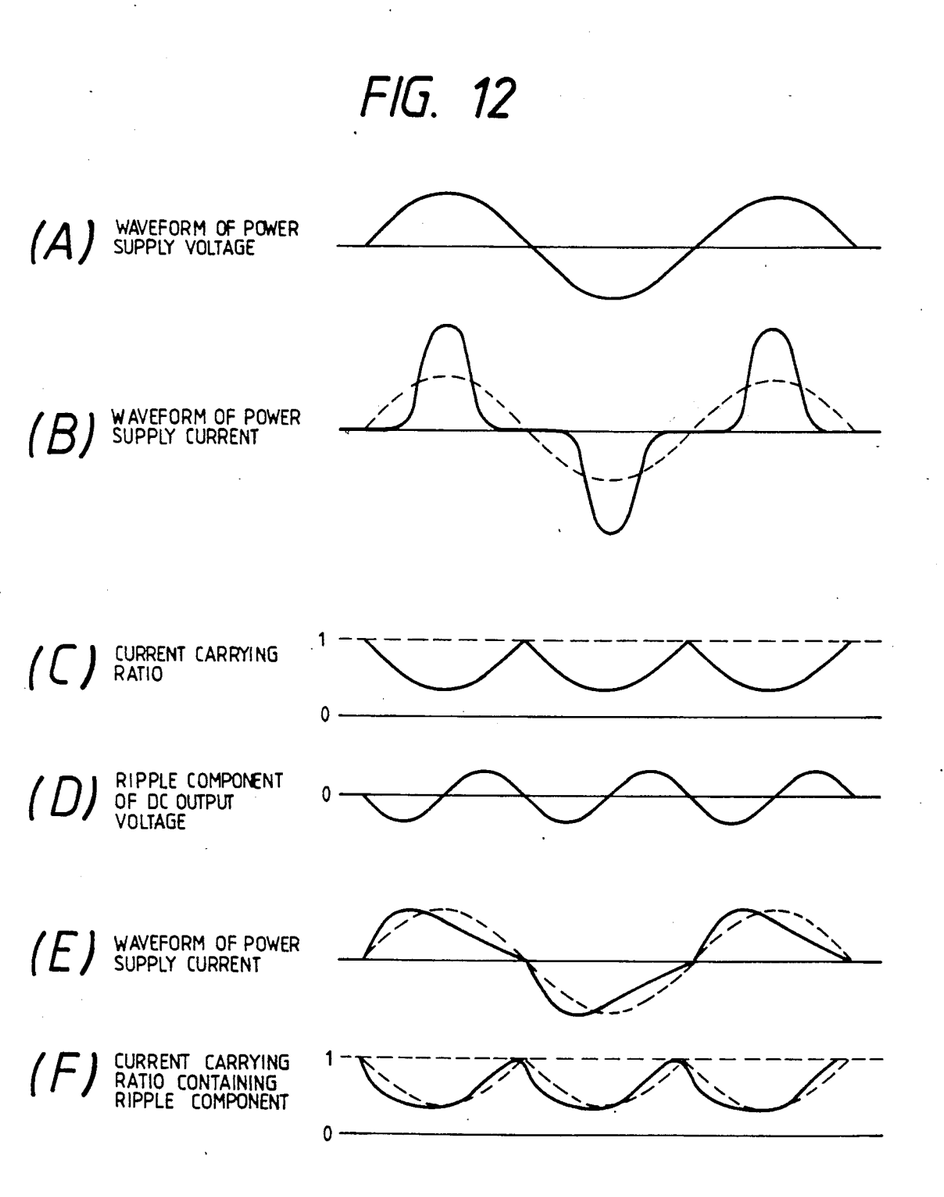
FIG. 12 is a diagram which illustrates the operation of a power source apparatus shown in FIG. 11.

FIG. 12 shows waveforms of a power source voltage, a power source current, a current carrying ratio of a transistor and a ripple component in the DC output voltage. When the transistor does not perform the switching operation, the power source current waveform contains much higher harmonic components as represented by a solid line in FIG. 12(B) since the power source current flows into the capacitor only when it is to be electrically charged. In order for the power source current to assume a sinusoidal waveform, the current carrying ratio must be increased in a region of a low power source voltage and must be decreased in a region of a high power source voltage. Therefore, when the power source current detecting and amplifying circuit produces an output of the positive sign, the above output is subtracted from a current carrying ratio instruction value that gives a maximum current carrying ratio, i.e., that gives 1 thereby to obtain a current carrying ratio instruction value. When the output is of the negative sign, the output is added thereto. Then, the current carrying ratio instruction value assumes a waveform as shown in FIG. 12(C); i.e., the current carrying ratio decreases in a region of a large power source current, i.e., decreases in a region of a high power source voltage, and the current carrying ratio increases in a region of a small power source current, i.e., increases in a region of a low power source voltage. The power source current assumes a sinusoidal waveform as represented by a broken line in FIG. 12(B), whereby the amount of higher harmonic components decreases and the power factor is improved.

When ripple components are contained in the DC output voltage as shown in FIG. 12(D), however, the power source current decreases with the increase in the DC voltage in compliance with the aforementioned equation (4) due to ripple components, and increases with the decrease in the DC voltage. Since the power source current changes as represented by a solid line in FIG. 12(E) due to ripple components in the DC output voltage, the current carrying ratio instruction varies, too, whereby the DC output voltage assumes a waveform that contains ripple components as represented by a solid line in FIG. 12(F). Namely, the change of the power source can not be suppressed so that the power source current no longer assumes the sinusoidal waveform and the power factor decreases.

Therefore, when the power source current detecting and amplifying circuit produces an output of the positive sign, the current ratio instruction value is obtained by subtracting the above output from a current carrying ratio instruction value that gives a maximum current carrying ratio, for example, 1. When the above output has the negative sign, the output is added thereto. When the ripple component output of the DC voltage ripple detecting and amplifying circuit is not inverted, the output is added thereto and when the ripple component output is inverted, the output is subtracted therefrom. Namely, change in the power source current caused by ripple components in the DC output voltage is corrected, so that the power source current assumes a sinusoidal waveform as indicated by a broken line in FIG. 12(E).

As the DC output voltage increases due to ripples, the output of the power source current detecting and amplifying circuit decreases so that the current carrying ratio increases. However, the change of the power source current can not be compensated completely. Thus, the output of the DC voltage ripple detecting and amplifying circuit assists to increase the current carrying ratio. Conversely, when the DC output voltage decreases due to ripples, the output of the power source current detecting and amplifying circuit increases so that the current carrying ratio decreases. However, the change of the power source current can not be compensated completely. Thus, the output of the DC voltage ripple detecting and amplifying circuit assists to decrease the current carrying ratio. By controlling the current carrying ratio, the power source current assumes a sinusoidal waveform to suppress ripples in the DC output voltage.

Figure 11:
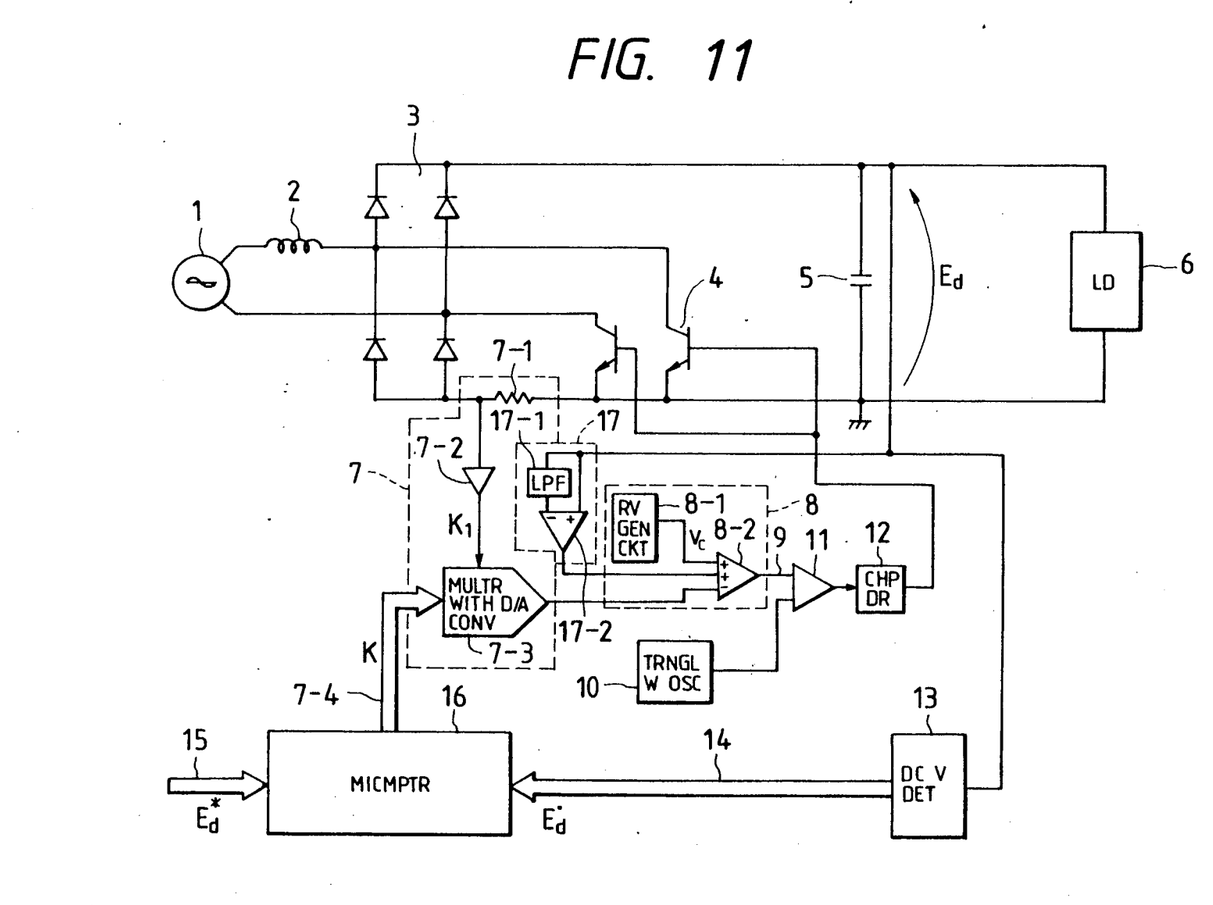
FIG. 11 shows a diagram illustrating a circuit structure of the 6th embodiment of the present invention.

In FIG. 11, the same parts as in FIG. 1 are indicated by the same symbols. Different from the embodiment in FIG. 1 is that a DC voltage ripple detecting and amplifying circuit 24 is provided for detecting and amplifying ripple components in the DC output voltage.

The DC voltage ripple detecting and amplifying circuit 24 consists of a low-pass filter 24-1 which removes ripple components from the DC output voltage Ed and produces a means value of the DC output voltage Ed, and a ripple detector and amplifier 24-2 which compares the output thereof with the DC output voltage Ed, detects the ripple components only, and amplifies the ripple components a predetermined number of times.

The operational amplifier 8-2 inputs the output Vc from the reference voltage generating circuit 8-1 and the ripple detector and amplifier 24-2 to the inverse terminals thereof, and the D/A converter 7-3 to the non-inverse terminal thereof.

The current carrying ratio instruction preparation means 8 consists of a reference voltage generating circuit 8-1, and an operational amplifier 8-2 which, when the output of the power source current detecting and amplifying circuit 7 has the positive sign, subtracts the output from the output Vc, which, when the output has the negative sign, adds the output thereto, which further adds the output thereto when the ripple component output of the DC voltage ripple detecting and amplifying circuit is not inverted, and which subtracts the output when the ripple component output is inverted, thereby preparing a current-carrying ratio instruction value 9. Here, the output Vc of the reference voltage generating circuit 8-1 is selected to become nearly equal to a maximum value of the triangular wave oscillator 10.

In this control circuit, if the resistance of the detect resistor 7-1 is denoted by R, the amplification factor of the power source current amplifier 7-2 by $K_1$, the power source current by Is, the ripple component in the DC voltage by $\Delta Ed$, and the amplification factor of the ripple detector and amplifier 24-2 by $K_2$, then the current carrying ratio instruction value 9, i.e., Vx is give by, $$Vx = Vc - KK_1 R Is + K_2 \Delta Ed \quad (8)$$

If the output Vc of the reference voltage generating circuit 8-1 is selected to become equal to a maximum output $V_H$ of the triangular wave oscillator, the current carrying ratio x is given by, $$x = \frac{Vx}{V_H} = 1 - \frac{KK_1 R}{V_H} Is + \frac{K_2}{V_H} \Delta Ed \quad (9)$$

whereby the power source current assumes a sinusoidal waveform because of the same reasons as mentioned above, and a unity power factor is obtained. The current carrying ratio x can be changed by changing the proportional gain K.

A DC voltage control procedure executed by the microcomputer 16 shown in FIG. 11 is similar to that shown in FIGS. 2 and 4.

Figure 13:
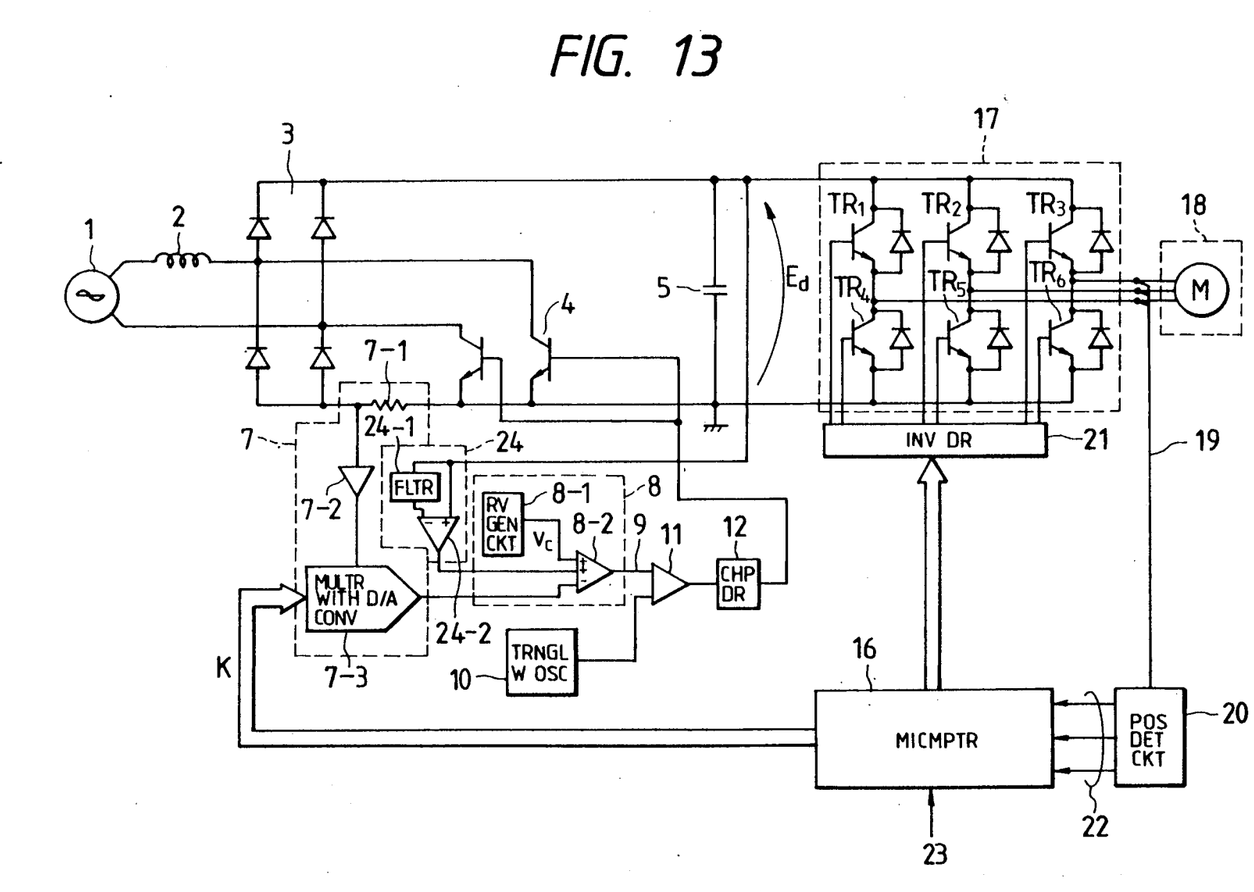
FIG. 13 shows a diagram illustrating a circuit structure the 7th embodiment of the present invention.

In FIG. 13, the same parts as in FIGS. 5 and 11 are indicated by the same symbols The output waveform of the position detecting signal 22 and the flow chart of the speed control procedure carried out by the microcomputer 16 in FIG. 13 are similar to that shown in FIGS. 6 and 7, respectively.

Figure 14:
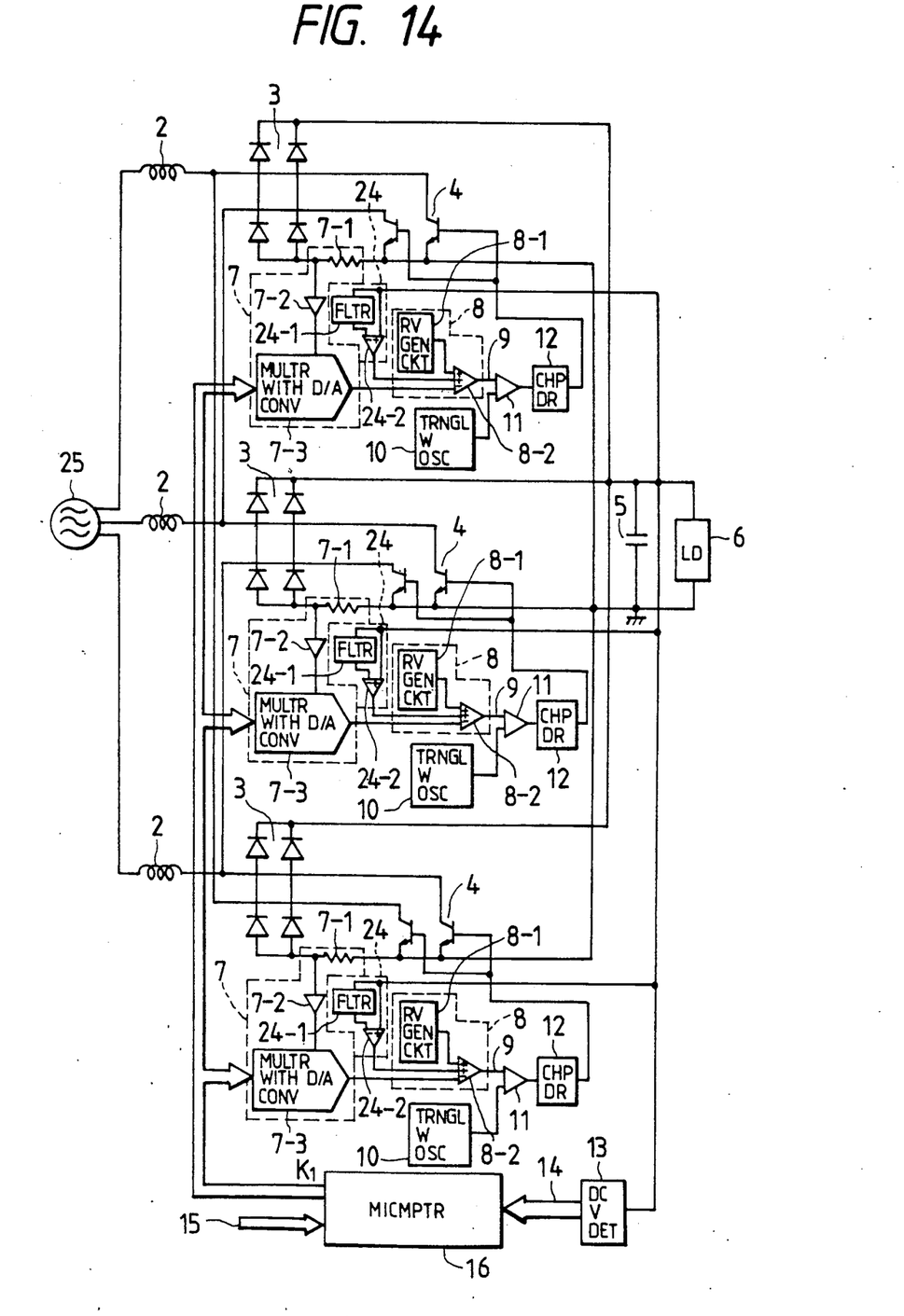
FIG. 14 is a diagram of the circuit structure of the 8th embodiment which inputs a power from a three-phase AC power source.

FIG. 14 illustrates a power source apparatus which inputs a three-phase AC power source 25 according to a still further embodiment. In this case, three single-phase power source apparatuses are combined together. The method of operation and the principle of operation are the same as those of the single-phase power source apparatus shown in FIG. 11.

The embodiments shown in FIGS. 11-14 obtain the same effect as those in FIGS. 1-8.

What we claim is:

1. A power source apparatus comprising:
   a rectifying circuit for converting AC power into DC power, said DC power including a power source current and a power source voltage;
   a smoothing circuit for smoothing said power source voltage to obtain a smoothed DC output voltage;
   a chopper circuit, including an inductor and at least one switching element, for improving a power factor of said power source apparatus; and
   a power source current detecting and amplifying circuit for detecting said power source current and amplifying said detected power source current in accordance with an amplification factor so as to produce an amplified power source current, wherein said amplified power source current is utilized as an OFF signal for controlling said at least one switching element so as to improve said power factor of said power source apparatus;
   said power source apparatus further comprising a motor speed controller in which an inverter and a motor are connected to an output terminal of said smoothing circuit, and a DC voltage detecting circuit for detecting said smoothed DC output voltage and inputting the detected smoothed DC output voltage to said motor speed controller, wherein said motor speed controller controls the speed of said motor by preparing a DC voltage instruction so that a deviation between the speed of said motor and a speed instruction for said motor becomes zero, and changing said amplification factor so that a deviation between said detected smoothed DC output voltage which is input to the motor speed controller and said DC voltage instruction becomes zero.

2. A power source apparatus comprising:
   a rectifying circuit for converting AC power into DC power, said DC power including a power source current and a power source voltage;
   a smoothing circuit for smoothing said power source voltage to obtain a smoothed DC output voltage;
   a chopper circuit, including an inductor and at least one switching element, for improving a power factor of said power source apparatus; and
   a power source current detecting and amplifying circuit for detecting said power source current and amplifying said detected power source current in accordance with an amplification factor so as to produce an amplified power source current, wherein said amplified power source current is utilized as an OFF signal for controlling said at least one switching element so as to improve said power factor of said power source apparatus;

said power source apparatus further comprising a motor speed controller in which an inverter and a motor are connected to an output terminal of said smoothing circuit, wherein said motor speed controller controls the speed of said motor by changing said amplification factor so that a deviation between the speed of said motor and a speed instruction for said motor becomes zero.

3. A power source apparatus comprising:
a rectifying circuit for converting AC power into DC power, said DC power including a power source current and a power source voltage;
a smoothing circuit for smoothing said power source voltage to obtain a smoothed DC output voltage;
a chopper circuit, including an inductor and at least one switching element, for improving a power factor of said power source apparatus;
a power source current detecting and amplifying circuit for detecting said power source current and amplifying said detected power source current in accordance with an amplification factor so as to produce an amplified power source current, wherein said amplified power source current is utilized as an OFF signal for controlling said at least one switching element so as to improve said power factor of said power source apparatus; and
a pulse-width modulation circuit for outputting a variable duty ratio signal for driving said at least one switching element on the basis of said OFF signal.

4. A power source apparatus according to claim 3, wherein said pulse-width modulation circuit comprises means for converting said OFF signal to an ON signal for controlling said at least one switching element, wherein said converting means is provided between said power source current detecting an amplifying circuit and said at least one switching element.

5. A power source apparatus comprising:
a rectifying circuit for converting AC power into DC power, said DC power including a power source current and a power source voltage;
a smoothing circuit for smoothing said power source voltage to obtain a smoothed DC output voltage;
a chopper circuit, including an inductor and at least one switching element, for improving a power factor of said power source apparatus; and
a power source current detecting and amplifying circuit for detecting said power source current and amplifying said detected power source current in accordance with an amplification factor so as to produce an amplified power source current, wherein said amplified power source current is utilized as an OFF signal for controlling said at least one switching element so as to improve said power factor of said power source apparatus;

said power source apparatus further comprising a DC voltage control means for controlling said smoothed DC output voltage by changing said amplification factor of said power source current detecting and amplifying means in such a manner that a deviation between said smoothed DC output voltage and a DC voltage instruction for controlling said smoothed DC output voltage becomes zero.

6. A power source apparatus comprising:
a rectifying circuit for converting AC power into DC power, said DC power including a power source current and a power source voltage;
a smoothing circuit for smoothing said power source voltage to obtain a smoothed DC output circuit;
a chopper circuit, including an inductor and at least one switching element, for improving a power factor of said power source apparatus; and
a power source current detecting and amplifying circuit for detecting said power source current and amplifying said detected power source current in accordance with an amplification factor so as to produce an amplified power source current, wherein said amplified power source current is utilized as an OFF signal for controlling said at least one switching element so as to improve said power factor of said power source apparatus;

said power source apparatus further comprising a DC voltage ripple detecting and compensating means for detecting ripple components in said smoothed DC output voltage, amplifying the detected ripple components, and controlling said at least one switching element in accordance with the amplified ripple components so as to compensate for the ripple components, wherein the DC voltage ripple detecting and compensating means reduces the ripple components in said smoothed DC output voltage.

7. A power source apparatus according to claim 6, further comprising a motor speed controller in which an inverter and a motor are connected to an output terminal of said smoothing circuit, and a DC voltage detecting circuit for detecting said smoothed DC output voltage and inputting said detected smoothed DC output voltage to said motor speed controller, wherein said motor speed controller controls the speed of said motor by preparing a DC voltage instruction so that a deviation between the speed of said motor and a speed instruction for said motor becomes zero, and changing said amplification factor so that a deviation between said detected smoothed DC output voltage which is input to the motor speed controller and said DC voltage instruction becomes zero.

8. A power source apparatus according to claim 6, further comprising a motor speed controller in which an inverter and a motor are connected to an output terminal of said smoothing circuit, wherein the motor speed controller controls the speed of said motor by changing said amplification factor so that a deviation between the speed of said motor and a speed instruction for said motor becomes zero.

9. A power source apparatus according to claim 6, wherein said DC voltage ripple detecting and compensating means comprises a filter circuit for producing an average value of the smoothed DC output voltage and an operational amplifier circuit for producing ripple components in accordance with said average value and said smoothed DC output voltage.

10. A power source apparatus according to claim 6, further comprising:
means for converting said OFF signal to an ON signal for controlling said at least one switching element, wherein said converting means is provided between said power source current detecting and amplifying circuit and said at least one switching element.

11. A power source apparatus comprising:

a rectifying circuit for converting AC power into DC power, said DC power including a power source current and a power source voltage;

a smoothing circuit for smoothing said power source voltage to obtain a smoothed DC output voltage; and a power factor improving circuit utilizing a switching element and an inductor to improve power factor, said power factor improving circuit comprising:

means for outputting an amplification factor for said power source current, said amplification factor being determined in accordance with said smoothed DC output voltage and a DC voltage instruction;

a power source current detecting and amplifying circuit for detecting said power source current and multiplying said detected power source current by said amplification factor to produce a first output signal; and means for generating an instruction value signal for controlling the operation of said switching element, said instruction value signal being determined in accordance with said first output signal and a reference signal provided by a constant DC voltage generating circuit, such that said generating means determines said instruction value signal by subtracting said first output signal from said reference signal;

said power source apparatus further comprising a motor speed controller in which an inverter and a motor are connected to an output terminal of said smoothing circuit, and a DC voltage detecting circuit for detecting said smoothed DC output voltage and inputting the detected smoothed DC output voltage to said motor speed controller, wherein said motor speed controller controls the speed of said motor by preparing said DC voltage instruction so that a deviation between the speed of said motor and a speed instruction for said motor becomes zero, and changing said amplification factor so that a deviation between said detected smoothed DC output voltage which is input to the motor speed controller and said DC voltage instruction becomes zero.

12. A power source apparatus comprising:

a rectifying circuit for converting AC power into DC power, said DC power including a power source current and a power source voltage;

a smoothing circuit for smoothing said power source voltage to obtain a smoothed DC output voltage; and a power factor improving circuit utilizing a switching element and an inductor to improve power factor, said power factor improving circuit comprising:

means for outputting an amplification factor for said power source current, said amplification factor being determined in accordance with said smoothed DC output voltage and a DC voltage instruction;

a power source current detecting and amplifying circuit for detecting said power source current and multiplying said detected power source current by said amplification factor to produce a first output signal; and means for generating an instruction value signal for controlling the operation of said switching element, said instruction value signal being determined in accordance with said first output signal and a reference signal provided by a constant DC voltage generating circuit, such that said generating means determines said instruction value signal by subtracting said first output signal from said reference signal;

said power source apparatus further comprising a motor speed controller in which an inverter and a motor are connected to an output terminal of said smoothing circuit, wherein said motor speed controller controls the speed of said motor by changing said amplification factor so that a deviation between the speed of said motor and a speed instruction for said motor becomes zero.

13. A power source apparatus comprising:

a rectifying circuit for converting AC power into DC power, said DC power including a power source current and a power source voltage;

a smoothing circuit for smoothing said power source voltage to obtain a smoothed DC output voltage; and a power factor improving circuit utilizing a switching element and an inductor to improve power factor, said power factor improving circuit comprising:

means for outputting an amplification factor for said power source current, said amplification factor being determined in accordance with said smoothed DC output voltage and a DC voltage instruction;

a power source current detecting and amplifying circuit for detecting said power source current and multiplying said detected power source current by said amplification factor to produce a first output signal;

means for generating an instruction value signal for controlling the operation of said switching element, said instruction value signal being determined in accordance with said first output signal and a reference signal provided by a constant DC voltage generating circuit, such that said generating means determines said instruction value signal by subtracting said first output signal from said reference signal, wherein said instruction value signal represents a current carrying ratio of said switching element and said reference signal represents a maximum current carrying ratio of said switching element; and means for detecting and amplifying ripple components in said smoothed DC output voltage, wherein said amplified ripple components are added to said reference signal;

said power source apparatus further comprising a motor speed controller in which an inverter and a motor are connected to an output terminal of said smoothing circuit, and a DC voltage detecting circuit for detecting said smoothed DC output voltage and inputting said detected smoothed DC output voltage to said motor speed controller, wherein said motor speed controller controls the speed of said motor by preparing said DC voltage instruction so that a deviation between the speed of said motor and a speed instruction for said motor becomes zero, and changing said amplification factor so that a deviation between said detected smoothed DC output voltage which is input to the motor speed controller and said DC voltage instruction becomes zero.

14. A power source apparatus according to claim 13, wherein the maximum current carrying ratio of said switching element is 1.

15. A power source apparatus comprising:
a rectifying circuit for converting AC power into DC power, said DC power including a power source current and a power source voltage;
a smoothing circuit for smoothing said power source voltage to obtain a smoothed DC output voltage; and
a power factor improving circuit utilizing a switching element and an inductor to improve power factor, said power factor improving circuit comprising:
means for outputting an amplification factor for said power source current, said amplification factor being determined in accordance with said smoothed DC output voltage and a DC voltage instruction;
a power source current detecting and amplifying circuit for detecting said power source current and multiplying said detected power source current by said amplification factor to produce a first output signal;
means for generating an instruction value signal for controlling the operation of said switching element, said instruction value signal being determined in accordance with said first output signal and a reference signal provided by a constant DC voltage generating circuit, such that said generating means determines said instruction value signal by subtracting said first output signal from said reference signal, wherein said instruction value signal represents a current carrying ratio of said switching element and said reference signal represents a maximum current carrying ratio of said switching element; and
means for detecting and amplifying ripple components in said smoothed DC output voltage, wherein said amplified ripple components are added to said reference signal;
said power source apparatus further comprising a motor speed controller in which an inverter and a motor are connected to an output terminal of said smoothing circuit, wherein the motor speed controller controls the speed of said motor by changing said amplification factor so that a deviation between the speed of said motor and a speed instruction for said motor become zero.

16. A power source apparatus according to claim 15, wherein the maximum current carrying ratio of said switching element is 1.

* * * * *